(No Model.)

H. W. CONKLING.
DEVICE FOR WATERING LIVE STOCK.

No. 389,546. Patented Sept. 18, 1888.

Witnesses
Geo. Y. Thorpe
R. J. Marshall Jr.

Inventor,
Henry W. Conkling
By his Attorneys
C. A. Snow & Co.

UNITED STATES PATENT OFFICE.

HENRY W. CONKLING, OF BURLINGTON, KANSAS.

DEVICE FOR WATERING LIVE STOCK.

SPECIFICATION forming part of Letters Patent No. 389,546, dated September 18, 1888.

Application filed May 2, 1888. Serial No. 272,600. (No model.)

*To all whom it may concern:*

Be it known that I, HENRY W. CONKLING, a citizen of the United States, residing at Burlington, in the county of Coffey and State of Kansas, have invented a new and useful Improvement in Devices for Watering Live Stock, of which the following is a specification.

The invention relates to improvements in the feeding attachments of water-troughs for horses and stock, the objects being to feed the trough automatically, to draw the water from the lower parts of ponds or other bodies of water, and to avoid the risk of the water freezing in the pipes; and it consists in the construction and novel combination of parts hereinafter described, illustrated in the accompanying drawings, and pointed out in the appended claim.

Figure 1:
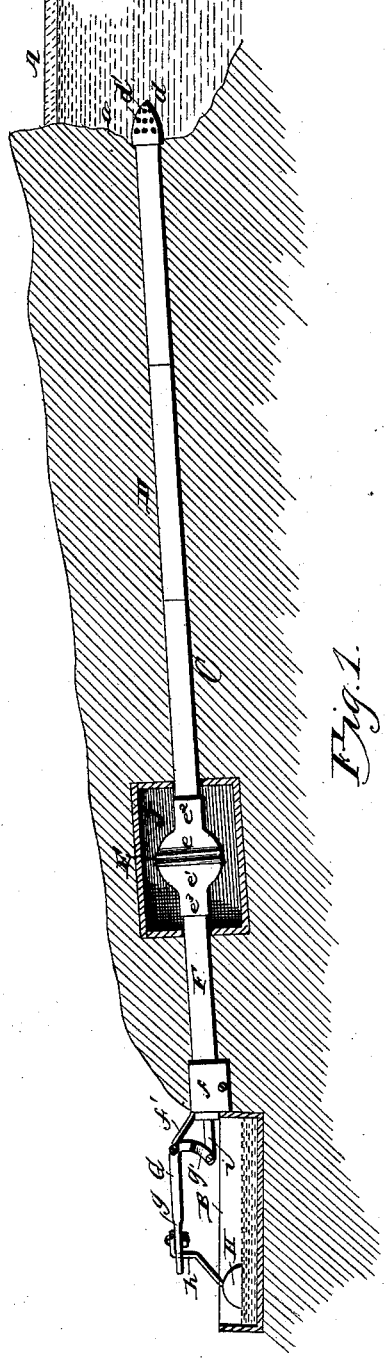
Figure 2:
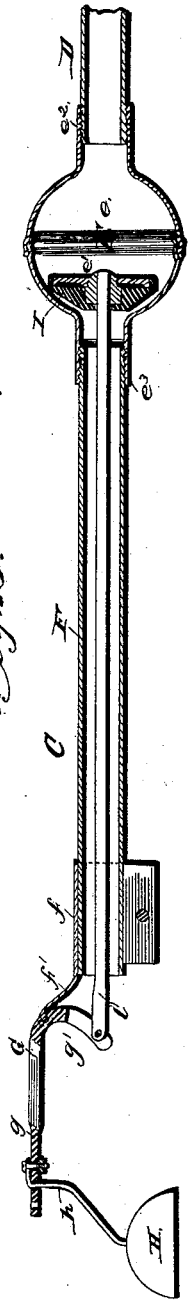

In the drawings, Figure 1 is a sectional view of the bank of a pond, showing the device unsectioned and discharging into a trough, the valve-chamber being inclosed in a box or casing. Fig. 2 is a central longitudinal section of the feeding device.

Referring to the drawings by letter, A designates a pond or other body of water, and $a$ the bank thereof.

B is a water-trough, of ordinary construction, and C is the device to convey the water from the pond to the trough, which device has the following construction:

D is a pipe, made in any desired number of sections, to regulate its length, the outermost section having the conical end $d$ provided with the perforations $d'$. The said pipe is passed through the bank of the pond sufficiently low down to draw water from the parts thereof that never become frozen.

E is a spherical or double-conical valve-casing, made in two equal sections, $e\ e'$, the bases of which screw together, as shown. The neck or sleeve $e^2$ of the section $e$ screws upon the outer end of the pipe D, and the neck or sleeve $e^3$ of the section $e'$ screws upon the adjacent end of a pipe, F, the opposite end of which is properly attached to the edge of the trough, as shown, and projects thereover a short distance. $f$ is a sleeve-bracket, bolted to said end, and having an upwardly-rising arm, $f'$, to which the angle-lever G is pivoted at its bend. The longitudinal arm $g$ of said lever has secured to it, near its end, the downwardly-projecting rod $h$, having the float H attached to its lower end. The depending arm $g'$ of the angle-lever is bifurcated, and has pivoted between the arms of its bifurcation the outer end of the valve-rod $i$, having on its inner end the plug-valve I, of rubber or other suitable material, which fits in the section $e'$ and closes the discharge-opening therefrom. When the water is low, the float, resting thereon, depresses the longitudinal arm of the angle-lever, moving the depending arm thereof inward with reference to the pipe F, and thereby moves the valve away from the discharge-opening of the valve-casing. As the water rises, the depending arm of the angle-lever is drawn outward, causing the valve to close the said discharge-opening.

The valve-casing, in localities in which the device is exposed to cold, is inclosed in a box, J, and embedded in the earth. The whole of the device, except the outer end and working mechanism, may be covered with earth, if desired.

As the water is drawn from the lower portions of the pond, and as the pipe D and valve-casing are underground, the water inward from the valve will not freeze, and as the pipe F inclines slightly downward toward the trough the water will drain from said pipe when the valve is closed.

In winter the sleeve-bracket $f$ may be unbolted and the float and angle-lever detached and the valve-rod pushed in by hand to cause water to flow into the trough. If the float should remain on, it might become embedded in ice and non-operative.

If it is desired to temporarily retain the device open and cause the water to flow continuously, the float may be weighted, so that it will not rise with the water.

Having described my invention, I claim—

The improved device for watering live stock herein described and shown, comprising the inlet-pipe D, having a strainer on one end, the sectional valve-casing, comprising the member $e$, screwed onto the end of the pipe D, and the member $e'$, screwed into the member $e$, the discharge-pipe F, having its inner end screwed into the member $e'$ of the valve-casing, the sleeve $f$, secured on the outer end of the discharge-pipe and having an outwardly and upwardly projecting arm, $f'$, the angle-lever pivoted to said arm and having the arm $g$ extending outward therefrom, and the bifurcated arm $g'$ extending downward therefrom, the rod $h$, secured to the arm $g$ and carrying a float, the valve in the valve-casing, and the rod extending through the discharge-pipe, and having one end secured to the valve and its other end pivoted in the bifurcation of the arm $g'$, substantially as specified.

In testimony that I claim the foregoing as my own I have hereto affixed my signature in presence of two witnesses.

HENRY W. CONKLING.

Witnesses:
ALEX LYLE,
WILLIAM HELM.